(12) United States Patent
Andeer et al.

(10) Patent No.: US 11,510,376 B2
(45) Date of Patent: Nov. 29, 2022

(54) ECOSYSTEM DEVICE FOR DETERMINING PLANT-MICROBE INTERACTIONS

(71) Applicants: Peter Andeer, Oakland, CA (US); Trent Northen, Walnut Creek, CA (US); Lloyd Cornmesser, San Ramon, CA (US)

(72) Inventors: Peter Andeer, Oakland, CA (US); Trent Northen, Walnut Creek, CA (US); Lloyd Cornmesser, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 270 days.

(21) Appl. No.: 16/876,415

(22) Filed: May 18, 2020

(65) Prior Publication Data

US 2020/0367456 A1    Nov. 26, 2020

Related U.S. Application Data

(60) Provisional application No. 62/850,097, filed on May 20, 2019.

(51) Int. Cl.
| | |
|---|---|
| *A01G 31/06* | (2006.01) |
| *A01G 22/25* | (2018.01) |
| *G01M 99/00* | (2011.01) |
| *G09B 23/38* | (2006.01) |
| *G01D 21/00* | (2006.01) |
| *A01G 31/00* | (2018.01) |

(52) U.S. Cl.
CPC ............. *A01G 31/06* (2013.01); *A01G 22/25* (2018.02); *G01D 21/00* (2013.01); *G01M 99/00* (2013.01); *G09B 23/38* (2013.01); *A01G 2031/006* (2013.01)

(58) Field of Classification Search
CPC ......... A01G 31/06; A01G 24/40; A01G 24/42
USPC ......................................................... 434/276
See application file for complete search history.

(56) References Cited

U.S. PATENT DOCUMENTS 10,470,379 B1 * 11/2019 Dong .................... G06T 7/0016
10,787,639 B2    9/2020 Gao et al.
(Continued)

OTHER PUBLICATIONS

Dubet et al., "Exploring rhizospheric interactions for agricultural sustainability: the need of integrative research on multi-trophic interactions," Journal of Clean Production, vol. 115, pp. 362-365 (Jan. 8, 2016).
(Continued)

*Primary Examiner* — Ricky Go

(57) ABSTRACT

This disclosure provides systems, methods, and devices related to the study of ecological processes. In one aspect, a device includes a base, a substrate, and an enclosure. The substrate is in contact with a first surface of the base. The substrate and the base define a root chamber. The enclosure is in contact with a second surface of the base. The base and the enclosure define a growth chamber. The base defines a stem port connecting the root chamber and the growth chamber. The base further defines a first port in fluid communication with the root chamber and a second port in fluid communication with the root chamber. The device is operable to contain a plant, roots of the plant being in the root chamber, a stem of the plant passing through the stem port, and leaves of the plant being in the growth chamber.

16 Claims, 6 Drawing Sheets

(56) References Cited

U.S. PATENT DOCUMENTS

| | | | | |
|---|---|---|---|---|
| 2008/0141585 | A1* | 6/2008 | Benfey | A01G 7/00 47/32.7 |
| 2008/0302006 | A1* | 12/2008 | Hurkx | A01G 31/06 47/61 |
| 2013/0167438 | A1* | 7/2013 | Swanda | A01C 1/06 47/57.6 |
| 2015/0264859 | A1* | 9/2015 | Morrissey | A01G 27/003 700/282 |
| 2018/0312800 | A1* | 11/2018 | Gao | C12M 23/34 |
| 2021/0267147 | A1* | 9/2021 | Filippov | A01G 24/44 |

OTHER PUBLICATIONS

Aufrecht et al., "Imaging the Root Hair Morphology of *Arabidopsis* Seedlings in a Two-layer Microfluidic Platform," Journal of Visualized Experiments, vol. 126, pp. e55971 (1-7), (Aug. 15, 2017).

Klitgaard et al., "Combining Stable Isotope Labeling and Molecular Networking for Biosynthetic Pathway Characterization," American Chemical Society, vol. 87, No. 13, pp. 6520-6526 (May 28, 2015).

Lisensky et al., "Replication and Compression of Surface Structures with Polydimethylsiloxane Elastomer," Journal of Chemical Education, vol. 75, No. 4, pp. 537-541, (Apr. 1999).

Nezhad, "Microfluidic platforms for plant cells studies," The Royal Society of Chemistry, vol. 14, No. 17, pp. 3262-3274, (2014).

Oburger et al., "Evaluation of a novel tool for sampling root exudates from soil-grown plants compared to conventional techniques." Environmental and Experimental Botany, vol. 87, pp. 235-247, (2013).

Parashar et al., "Plant-in-chip: Microfluidic system for studying root growth and pathogenic interactions in *Arabidopsis*," Applied Physics Letters, vol. 98, pp. 263703-1 thru -3, (Jun. 29, 2011).

Singh et al., "Agriculturally Important Microbes in Sustainable Food Production," Trends in Biotechnolgy, vol. 34, No. 10, pp. 773-775, (Oct. 2016).

Grossmann et al., "The RootChip: An Integrated Microfluidic Chip for Plant Science," The Plant Cell, vol. 23, pp. 4234-4240, (Dec. 2011).

Wenzel et al., "Novel rhizobox design to assess rhizosphere characteristics at high spatial resolution," Plant and Soil, vol. 237, pp. 37-45, (Jul. 29, 2001).

Busby et al., "Research priorities for harnessing plant microbiomes in sustainable agriculture," PLOS Biology. vol. 15, No. 3, pp. 1-14, e2001793 (Mar. 28, 2017).

Busch et al., "A microfluidic device and computational platform for high-throughput live imaging of gene expression," Nature Methods. vol 9, No. 11, pp. 1101-1106 (Nov. 2012).

Farrar et al., "Understanding and engineering beneficial plant-microbe interactions: plant growth promotion in energy crops," Plant Biotechnology Journal, vol. 12, No. 9, pp. 1193-1206 (Nov. 23, 2014).

Finkel et al., "Understanding and exploiting plant beneficial microbes," Current Opinion in Plant Biology, vol. 38, pp. 155-163, (Aug. 2017).

Friend et al., "Fabrication of microfluidic devices using polydimethylsiloxane," AIP Biomicrofluidics, vol. 4, No. 2, pp. 026502-1-026502-5 (Mar. 15, 2010).

Gao et al., "Application of Black Silicon for Nanostructure-Initiator Mass Spectrometry," American Chemical Society, vol. 88, No. 3, pp. 1625-1630 (Jan. 7, 2016).

Gao et al., "Morphology-Driven Control of Metabolite Selectivity Using Nanostructure-Initiator Mass Spectrometry," American Chemical Society, vol. 89, No. 12, pp. 6521-6526 (May 18, 2017).

Gao et al., "Ecosystem Fabrication (EcoFAB) Protocols for The Construction of Laboratory Ecosystems Designed to Study Plant-microbe Interactions," Journal of Visualized Experiments, vol. 134, e57170, pp. 1-16, (Apr. 10, 2018).

Garvin et al., "Development of Genetic and Genomic Research Resources for Brachypodium distachyon, a New Model System for Grass Crop Research," The Plant Genome [A Supplement to Crop Science], .vol. 48, (Supplement_1 ), pp. S69-S84 (Mar. 1, 2008).

Hunter et al., "Plant microbiomes and sustainable agriculture," EMBO Reports, vol. 17, No. 12, pp. 1696-1699, (Dec. 1, 2016).

Jiang et al., "Plant chip for high-throughput phenotyping of *Arabidopsis*," Royal Society of Chemistry, Lab on a Chip, vol. 14, No. 7, pp. 1281-1293 (Jaunary 3, 2014).

Kamilova et al., "Enrichment for enhanced competitive plant root tip colonizers selects for a new class of biocontrol bacteria," Environmental Microbiology vol. 7, No. 11, pp. 1809-1817 (Sep. 6, 2005).

Lopez-Bucio et al., "The role of nutrient availability in regulating root architecture," Current Opinion in Plant Biology, vol. 6, No. 3, pp. 280-287, (Jun. 2003).

Lynch, "Steep, cheap and deep: an ideotype to optimize water and N acquisition by maize root systems," Annals of Botany, vol. 112, No. 2, pp. 347-357, (Jan. 17, 2013).

Massalha et al., "Live imaging of root-bacteria interactions in a microfluidics setup," Proceedings of the National Academy of Sciences USA, vol. USA, No. 17, pp. 4549-4554 (Mar. 2, 2017).

Morrissey et al., "Are microbes at the root of a solution to world food production". EMBO Reports, vol. 5, No. 10, pp. 922-926 (Oct. 1, 2004).

Northen et al., "Advancing Our Understanding of the Chemistry of Soil Microbiomes. National Academies of Sciences, Engineering, and Medicine," The Chemistry of Microbiomes: Proceedings of a Seminar Series. The National Academies Press. Washington, DC. (2017).

Rellan-Alvarez et al., "GLO—Roots: an imaging platform enabling multidimensional characterization of soil-grown root systems." elife, Tools and Resources, vol. 4, e07597, p. 1 of 26, (Aug. 19, 2015).

Reynolds et al., "Grassroots Ecology: Plant-Microbe-Soil Interactions As Drivers Of Plant Community Structure And Dynamics," Ecology. vol. 84, No. 9, pp. 2281-2291 (2003).

Rubel et al., "OpenMSI: A High-Performance Web-Based Platform for Mass Spectrometry Imaging." American Chemical Society, vol. 85, No. 21, pp. 10354-10361 (Oct. 2, 2013).

Nezhad et al., "Quantification of cellular penetrative forces using lab-on-a-chip technology and finite element modeling." Proceedings of the National Academy of Sciences, USA, vol. 110, No. 20, pp. 8093-8098 (May 14, 2013).

Sumner et al., "Proposed minimum reporting standards for chemical analysis Chemical Analysis Working Group (CAWG) Metabolomics Standards Initiative (MSI)," Metabolomics, vol. 3, No. 3, pp. 211-221 (Sep. 12, 2007).

Van Der Heijden et al., "Networking in the Plant Microbiome." PLoS Biology, vol. 14, No. 2, e1002378 , pp. 1-9, (Feb. 12, 2016).

Van Der Krift et al., "Root life spans of four grass species from habitats differing in nutrient availability," Functional Ecology, vol. 16, No. 2, pp. 198-203 (Apr. 2002).

Vessey, Plant growth promoting rhizobacteria as biofertilizers., Plant and Soil, vol. 255, No. 2, pp. 571-586 (Mar. 27, 2003).

Woo et al., "Nanostructure-initiator mass spectrometry: a protocol for preparing and applying NIMS surfaces for high-sensitivity mass analysis" Nature Protocols, vol. 3, No. 8, pp. 1341-1349 (Jul. 31, 2008).

Yang et al., "Rhizosphere bacteria help plants tolerate abiotic stress," Trends in Plant Science, vol. 14, No. 1, pp. 1-4 (Jan. 2009).

Yao et al., "Analysis of Metabolomics Datasets with High-Performance Computing and Metabolite Atlases." Metabolites, vol. 5, No. 3, pp. 431-442 (Jul. 20, 2015).

Marx, V. (2019). "Engineers embrace microbiome messiness." Nature Methods, 16, 581-584 (2019).

Sasse, J., et al. "Multilab EcoFAB study shows highly reproducible physiology and depletion of soil metabolites by a model grass." New Phytologist, 222(2), 1149-1160, (2019).

Zengler, K., et al. "EcoFABs: advancing microbiome science through standardized fabricated ecosystems." Nature Methods, 16, 567-571 (2019).

(56) References Cited

OTHER PUBLICATIONS

Zhalnina, K., et al. "Need for Laboratory Ecosystems To Unravel the Structures and Functions of Soil Microbial Communities Mediated by Chemistry." MBio 9(4), e01175-18 (2018).

* cited by examiner

US 11,510,376 B2

ECOSYSTEM DEVICE FOR DETERMINING PLANT-MICROBE INTERACTIONS

RELATED APPLICATIONS

This application claims priority to U.S. Patent Application No. 62/850,097, filed May 20, 2019, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to the field of determining ecological processes, and more particularly to determining plant-microbe interactions.

BACKGROUND

EcoFABs, or laboratory ecosystems, can be used to study plant, soil, and other microbiomes using small plant and microbe growth chambers for controlled, replicable, laboratory experiments. EcoFABs platforms, systems, and devices are described in U.S. patent application Ser. No. 15/963,887, filed Apr. 26, 2018, which is herein incorporated by reference.

SUMMARY

One innovative aspect of the subject matter described in this disclosure can be implemented in a device including a base, a substrate, and an enclosure. The substrate is in contact with a first surface of the base. The substrate and the base define a root chamber. The enclosure is in contact with a second surface of the base. The base and the enclosure define a growth chamber. The base defines a stem port connecting the root chamber and the growth chamber. The base further defines a first port in fluid communication with the root chamber and a second port in fluid communication with the root chamber. The device is operable to contain a plant, roots of the plant being in the root chamber, a stem of the plant passing through the stem port, and leaves of the plant being in the growth chamber.

In some embodiments, the device further includes a backing plate. The backing plate is affixed to the base. The backing plate is operable to hold the substrate in contact with the first surface of the base.

In some embodiments, the device further includes a gasket. The gasket is disposed between the substrate and the base.

In some embodiments, the substrate comprises a sheet of glass.

In some embodiments, a diameter of the stem port is about 1 millimeter to 5 millimeters.

In some embodiments, the base and the enclosure each comprise a polymer. In some embodiments, the base and the enclosure each comprise a material selected from a group consisting of polycarbonate, polypropylene, polyethylene, and a cyclic olefin copolymer.

In some embodiments, the first surface of the base has a smaller thickness proximate the first port compared to the second port such that substrate has a downward slope from level from the first port to the second port when the device is sitting on a level surface. In some embodiments, the substrate has a downward slope of about 0.5 to 30 degrees from level from the first port to the second port.

In some embodiments, a volume of the root chamber is about 4 milliliters to 20 milliliters. In some embodiments, a volume of the growth chamber is about 250 milliliters to 1000 milliliters.

In some embodiments, the enclosure is transparent to visible light and to infrared light. In some embodiments, the base is transparent to infrared light, and the base blocks at least a portion of light in the visible spectrum.

In some embodiments, the base includes a feature proximate the second port. The feature is operable to prevent roots of the plant from growing into the second port. In some embodiments, the feature includes a raised platform on a surface of the base. The platform and the substrate define a channel operable to permit fluid to flow from the root chamber to the second port.

In some embodiments, ridges are defined on the enclosure. The ridges are operable to aid a robotic arm in manipulating the device. In some embodiments, indentations are defined in the base. The indentations are operable to aid a robotic arm in manipulating the device.

In some embodiments, the first port is outside of the growth chamber, and the second port is outside the growth chamber.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
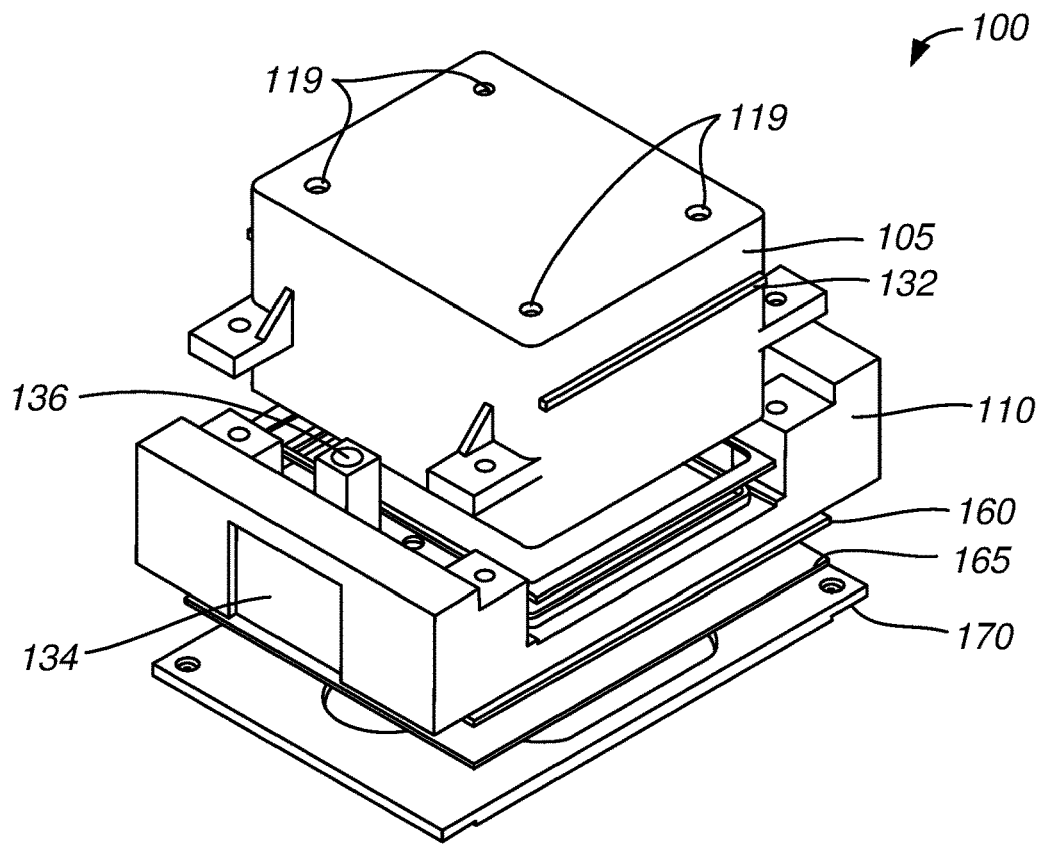
FIGS. 1 and 2 show examples of schematic illustrations of an EcoFAB device.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Described herein are embodiments of an EcoFAB device that can be used in an EcoFAB system. Both EcoFAB devices and systems are described in U.S. patent application Ser. No. 15/963,887.

Embodiments of EcoFAB devices described herein may include: (1) standardization of the EcoFAB device base to make it compatible with existing platforms for analyzing biological samples; (2) features that make the EcoFAB device compatible for fabrication via injection molding, which also allows for greater material selection; (3) sampling ports outside of the growth chamber of the EcoFAB device for non-invasive media exchange and sampling, with the sampling ports being sealed by a gasket on the underside of the EcoFAB device; (4) an EcoFAB device internal base surface that provides a slope to the root chamber while keeping the base flat; (5) the base and enclosure of the EcoFAB device including features that allow for automatic handling by robotic grippers; and (6) the exterior ports of the EcoFAB device being designed to allow for sampling without roots clogging the inlets/outlets.

In some embodiments, an EcoFAB device includes features that make the device compatible with high-throughput production method using a number of different materials. Some of the EcoFAB devices described in U.S. patent application Ser. No. 15/963,887 were fabricated using soft-lithography techniques (e.g., using polydimethylsiloxane (PDMS)) to form the enclosure. In some embodiments, an EcoFAB device described herein is designed for compatibility with high-throughput production methods such as injection molding. An EcoFAB device can be fabricated more quickly with an injection molding process compared to a soft-lithography technique. In addition, with an injection molding process, other polymers (e.g., polycarbonate, polypropylene, polyethylene, cyclic olefin copolymer) can be used to fabricate an EcoFAB device. Further, materials with additives can be used in injection molding processes, allowing for the fabrication of an EcoFAB device that is clear, opaque, or has limited light penetration (e.g., blocking specific wavelengths, blocking visible light, etc.).

Figure 2:
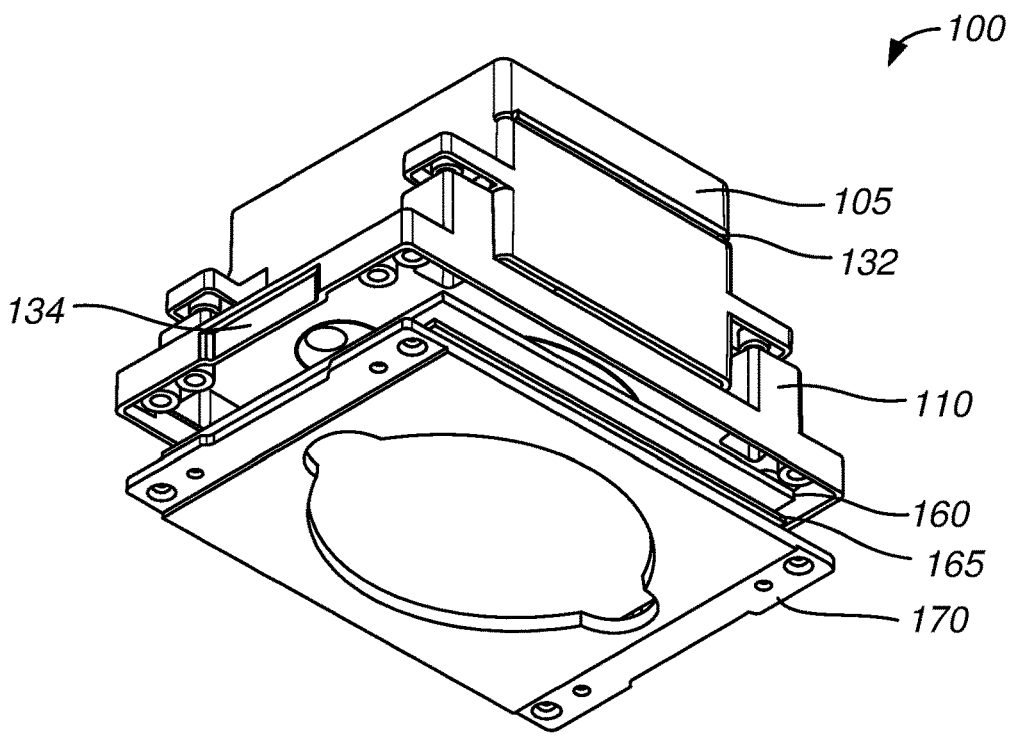
Figure 3:
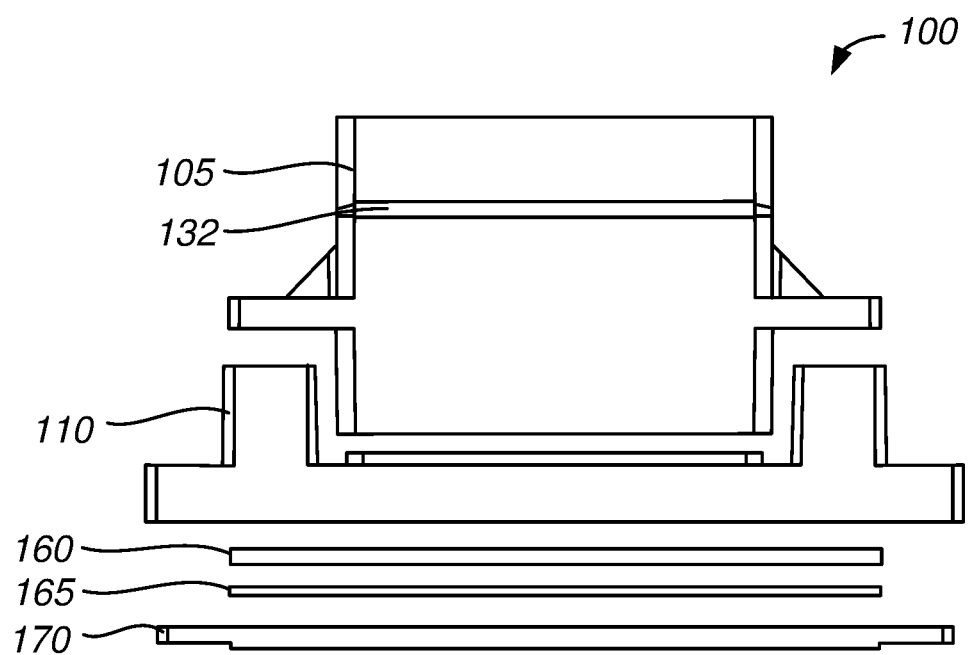
FIGS. 3 and 4 show examples of schematic illustrations of a side view and an end-view of an EcoFAB device.
Figure 4:
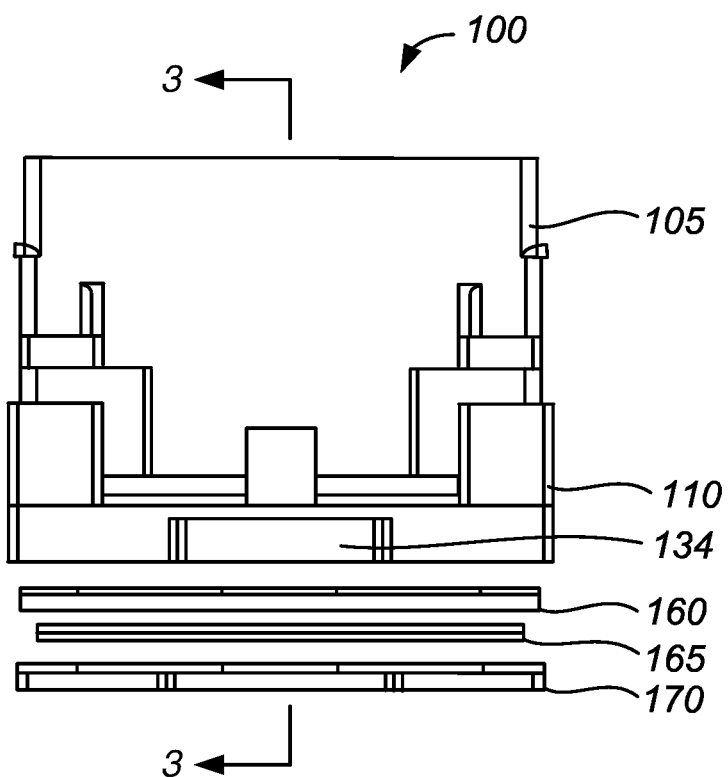
Figure 5:
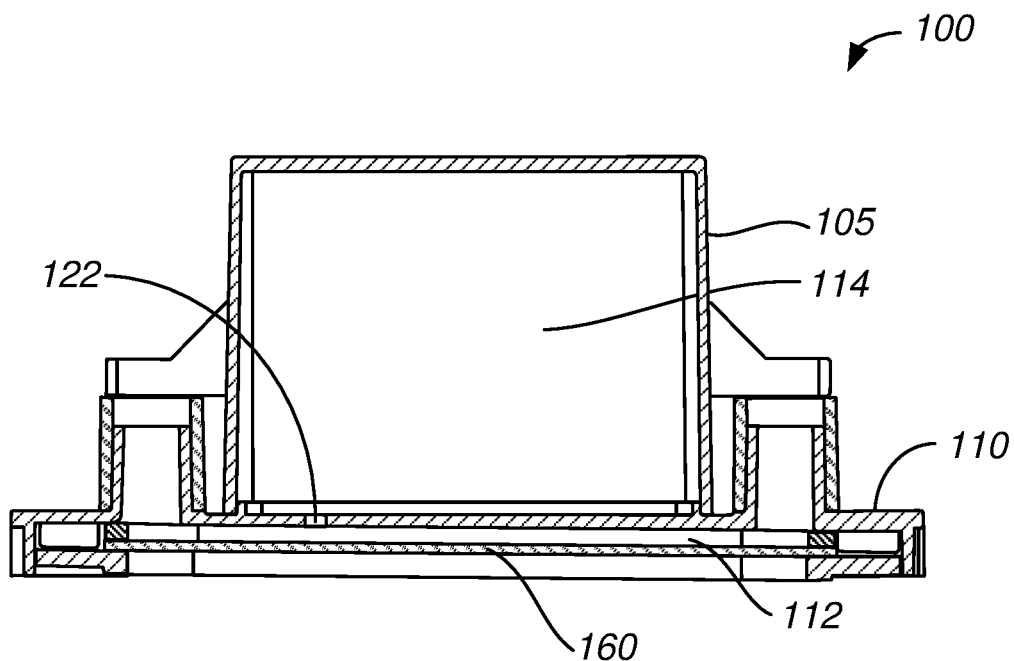
FIGS. 5 and 6 show examples of cross-sectional schematic illustrations of an EcoFAB device.
Figure 6:
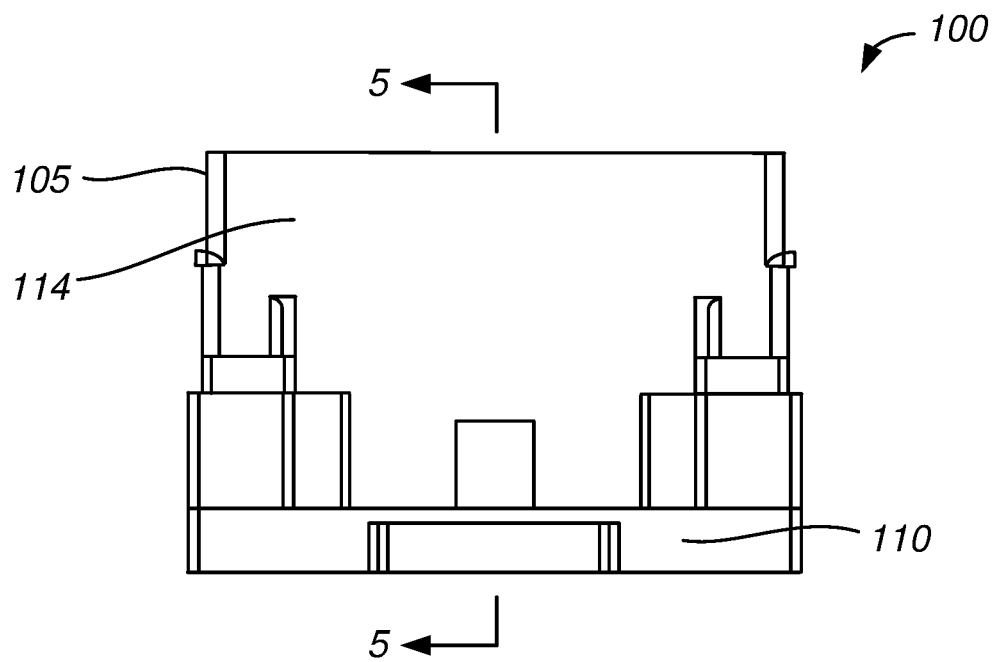
Figure 7:
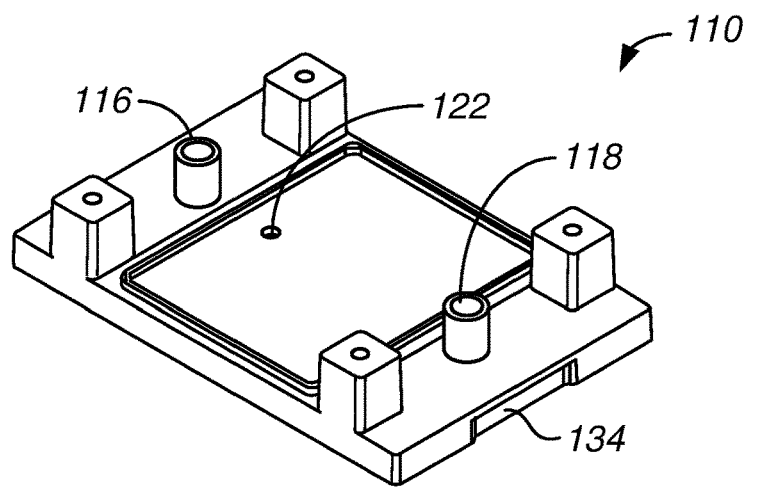
FIGS. 7-9 show examples of schematic illustrations of a base of an EcoFAB device.
Figure 8:
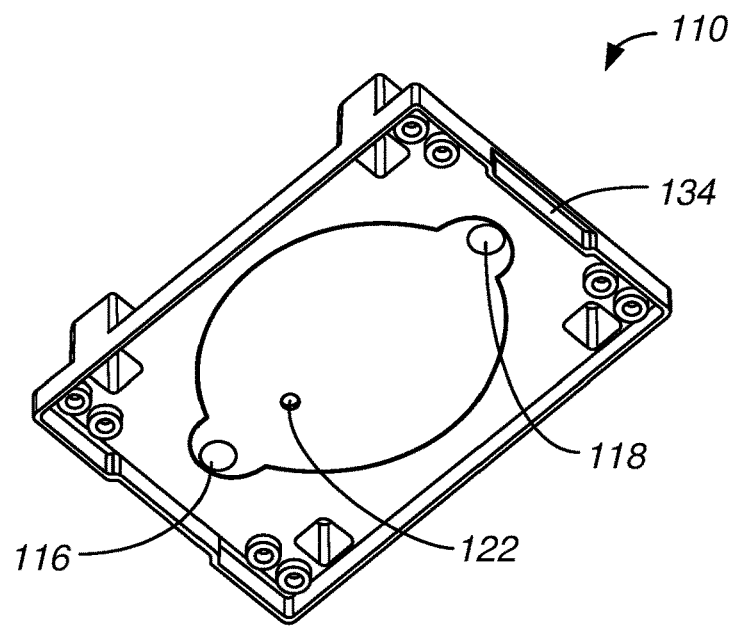
Figure 9:
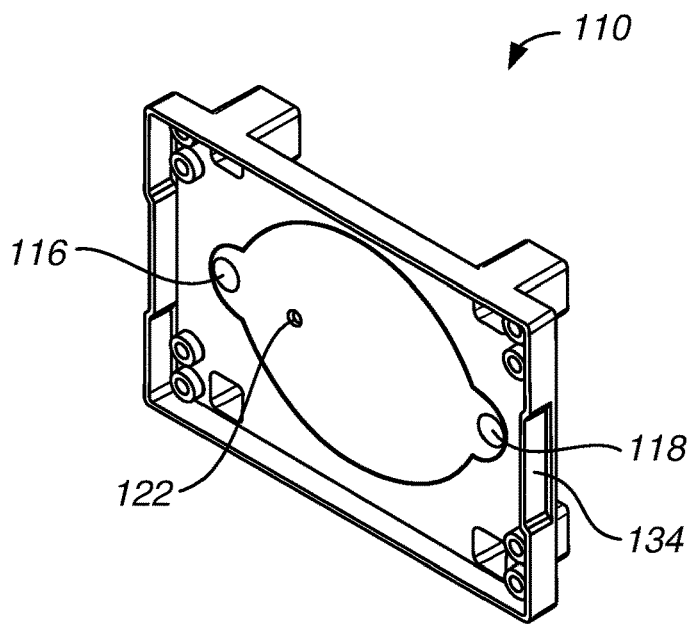
Figure 10:
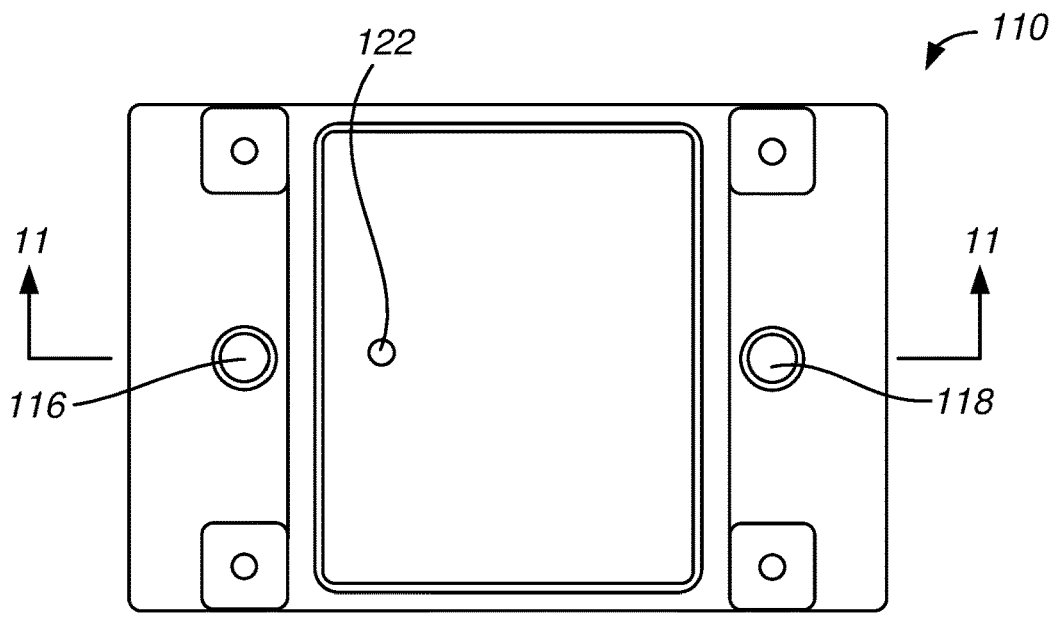
FIG. 10 shows an example of a schematic illustration of a top-view of a base of an EcoFAB device.
Figure 11:
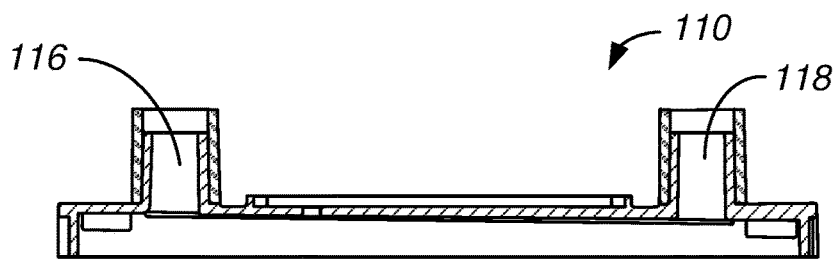
FIG. 11 shows an example of a cross-sectional schematic illustration of a side-view of a base of an EcoFAB device.
Figure 12:
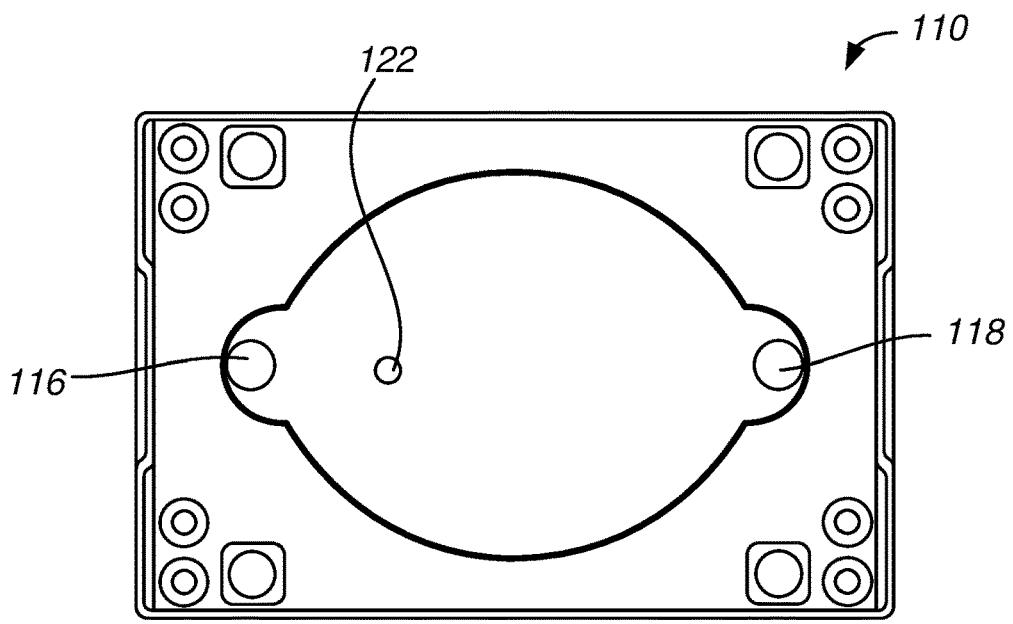
FIG. 12 shows an example of a schematic illustration of a bottom-view of a base of an EcoFAB device.

FIGS. 1 and 2 show examples of schematic illustrations of an EcoFAB device. FIGS. 3 and 4 show examples of schematic illustrations of a side view and an end-view of an EcoFAB device. FIGS. 5 and 6 show examples of cross-sectional schematic illustrations of an EcoFAB device. FIGS. 7-9 show examples of schematic illustrations of a base of an EcoFAB device. FIG. 10 shows an example of a schematic illustration of a top-view of a base of an EcoFAB device. FIG. 11 shows an example of a cross-sectional schematic illustration of a side-view of a base of an EcoFAB device. FIG. 12 shows an example of a schematic illustration of a bottom-view of a base of an EcoFAB device.

As shown in FIG. 1-12, an EcoFAB device 100 includes an enclosure 105, a base 110, and a substrate 165. In some embodiments, the device 100 includes a gasket 160 and a backing plate 170.

The substrate 165 is in contact with a first surface of the base 110. The substrate 165 and the base 110 define a root chamber 112. The enclosure 105 is in contract with a second surface of the base 110. The base 110 and the enclosure 105 define a growth chamber 114. The base 110 defines a stem port 122 that connects the root chamber 112 and the growth chamber 114. In some embodiments, a ridge on the second side of the base 110 helps to ensure that the enclosure 105 sits tightly on the base 110 to avoid contaminants entering into the growth chamber 112.

In some embodiments, a gasket (not shown) is disposed between the enclosure 105 and the base 110. In some embodiments, the gasket is an O-ring. In some embodiments, a grove (not shown) is defined in the base 110 such that the gasket fits within the grove. Such a gasket would help in sealing the growth chamber 114 for creating a controlled atmosphere. In some embodiments, ports 119 are defined in the enclosure 105. Ports 119 could allow for air exchange or could be connected to tubing or other gas flow system to create a controlled atmosphere.

The base 110 further defines a first port 116 and a second port 118. The first port 116 and the second port 118 are both in fluid communication with the root chamber 112. In some embodiments, the first port 116 is outside of the growth chamber 114. In some embodiments, the second port 118 is outside of the growth chamber 114. In some embodiments, the first port 116 and the second port 118 are able to accept or interface with a pipette. The first port 116 and the second port 118 may have covers or caps placed on them when not in use. These features can make the device 100 compatible with automated platforms (e.g., robotic sampling). The first port 116 and the second port 118 located outside of the growth chamber 114 allows for manual or automated pipetting, as well as connection to pumps, without opening the device 100. This also minimizes the chances of contamination due to opening and closing the growth chamber 114.

The device 100 is operable to contain a plant. Roots of the plant are in the root chamber 112. A stem of the plant passes through the stem port 122. Leaves of the plant are in the growth chamber 114. In some embodiments, a volume of the root chamber 112 is about 4 milliliters (mL) to 20 mL, about 1 mL to 5 mL, or about 4 mL to 5 mL. In some embodiments, a diameter of the stem port 122 is about 1 millimeter (mm) to 5 mm, or about 3 mm. In some embodiments, a volume of the growth chamber 114 is about 250 milliliters (mL) to 1000 mL. This corresponds to a height of the growth chamber of about 50 mm (for a 250 mL growth chamber) to 200 mm (for a 1000 mL growth chamber).

The backing plate 170 is affixed to the base 110. The backing plate 170 serves to hold the substrate 165 in contact with the first surface of the base 110.

In some embodiments, the device 100 includes features that make it better able to operate under aseptic conditions. For example, the root chamber 112 is set on the underside of the growth chamber 114 for the device 100. This largely seals the root chamber 112 off from the growth chamber 114. In some embodiments, the gasket 160 is disposed between the substrate 165 and the base 110. The gasket 160 aids in forming a seal between the substrate 165 and the base 110 that is not permeable to a liquid. The gasket 160 can seal the root chamber 112 from the outside environment. In some embodiments, the gasket 160 comprises a polymer.

In some embodiments, the base 110 and the enclosure 105 each comprise a polymer. In some embodiments, the base 110 and the enclosure 105 each comprise a material selected from a group consisting of polycarbonate, polypropylene, polyethylene, and cyclic olefin copolymer. In some embodiments, the base 110 and the enclosure 105 can be fabricated using injection molding. In some embodiments, the base 110 and the substrate 165 are a single piece of material. For example, in some embodiments, the base 110 and the substrate 165 are fabricated (e.g., injection molded) as a single piece using a polymer.

In some embodiments, the enclosure 105 is transparent to visible light and to infrared light. In some embodiments, the base 110 is transparent to visible light and to infrared light. In some embodiments, the base 110 is transparent to infrared light and blocks at least a portion of light in the visible spectrum. Such a base 110 (i.e., a base blocking at least a portion of light or all of the light in the visible spectrum) can more closely replicate the conditions of a plant growing in soil.

In some embodiments, the substrate 160 comprises a sheet of glass (e.g., a borosilicate glass). In some embodiments, the substrate 160 is transparent to visible light. The substrate 160 being optically transparent allows for imaging and microcopy of roots in the root chamber 112.

In some embodiments, the backing plate 170 comprises a polymer. In some embodiments, the backing plate 170 comprises a material selected from a group consisting of polycarbonate, polypropylene, polyethylene, and cyclic olefin copolymer. In some embodiments, the backing plate 170 can be fabricated using injection molding.

For plant growth studies and automated sampling, it may be important to have gravity flow of a liquid from an inlet port (e.g., the first port 116) to outlet port (e.g., the second port 118) of the device 100. However, most automated systems require a device to sit flat and the ports to be accessed vertically. To address this issue, in some embodiments, the first surface of the base 110 is sloped (e.g., at about 0.5° to 30°, or greater than about 30°). The exterior of the base 100 is flat. The substrate 165 in contact with the first surface of the base 110 would then be sloped. Such a sloped substrate 165 creates gravitropism in the root chamber 112 to guide root growth of the plant.

So that the substrate 165 of the device 100 is sloped, in some embodiments, the first surface of the base 110 has a smaller thickness proximate or at the first port 116 compared to the second port 118, imparting a downward slope of the substrate 165 from level from the first port 116 to the second port 118 when the device 100 is sitting on a level surface. This difference in thickness of the first surface of the base 110 can be seen in FIG. 11. In some embodiments, the substrate 165 has a downward slope of about 0.5 to 30 degrees from level from the first port 116 to the second port 118. This slope of the substrate 165 allows for flow of a liquid from the first port 116 to the second port 118 while the device 100 is sitting on a level surface.

Many devices used in high-throughput micro- and molecular-biology (e.g., microwell plates) conform to standard footprint established by the Society for Biomolecular Screening (SBS), which has dimensions of 85.48 mm by 127.76 mm. In some embodiments, the base 110 of the device 100 has dimensions that conform to the SBS standard; i.e., in some embodiments, the base 110 of the device 100 is about 85.48 mm by 127.76 mm.

A device 100 may include features that make it compatible with automated platforms. In some embodiments, features are defined on the base 110 and the enclosure 105. The features serve to aid a robotic arm in gripping and manipulating the device 100. For example, in some embodiments, ridges 132 are defined on the enclosure 105. In some embodiments, the enclosure only includes one set of ridges to allow for injection molding without undercuts. As another example, in some embodiments, indentations 134 are defined in the base 110. Such features can allow a robotic device to grip the device 100 at multiple locations. These features can allow the device 100 to be situated in multiple positions, as well as allowing for a robotic device to reach over other devices 100 and grip one device 100 from behind.

An EcoFAB system can be setup as an automated system. For example, an existing automated system (e.g., an automated liquid handling robot, Hamilton Company, Reno, Nev.) could be adapted to incubate and image devices 100. In addition, such an automated system could be contained in one unit, allowing for easier maintenance of aseptic conditions. For example, a robot could take a device 100 from a photo-incubator and transport it to a liquid handling system to sample, replenish, or change the solution in the device. The robot could then transport the device 100 to a bay that could house imaging stations to image the plant, plant roots, microorganisms in the rhizosphere, etc.

Such an EcoFAB system could also be implemented with machine learning algorithms so that the system could operate based on data gathered during operation. Examples of such machine learning include:

- altering the refilling and sampling frequency based on plant size and health (this could be dependent on plant size or recognition of depletion of liquid from an EcoFAB device due to large air bubbles in the chamber, for example);
- altering lighting or heating conditions if there are indications that the plants cannot survive in the conditions being used;
- stopping the analysis of dead plants; and
- analyzing low-magnification images of the plant roots to identify spots of interest for high-magnification imaging.

Plant root growth can impair sampling of media by clogging the inlets and outlets (e.g., the first port and the second port) of a device. To mitigate this problem, in some embodiments, the sampling ports of an EcoFAB device are surrounded by a series a features. Such features can include multiple flow paths and regions not accessible to roots, but allowing for the flow of a liquid.

Figure 13:
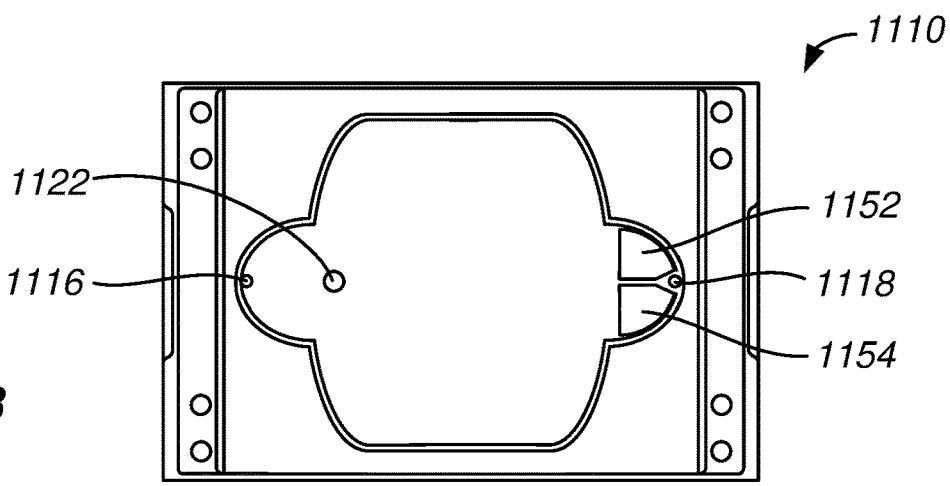
FIG. 13 shows an example of a schematic illustration of a bottom-view of a base of an EcoFAB device.
Figure 14:
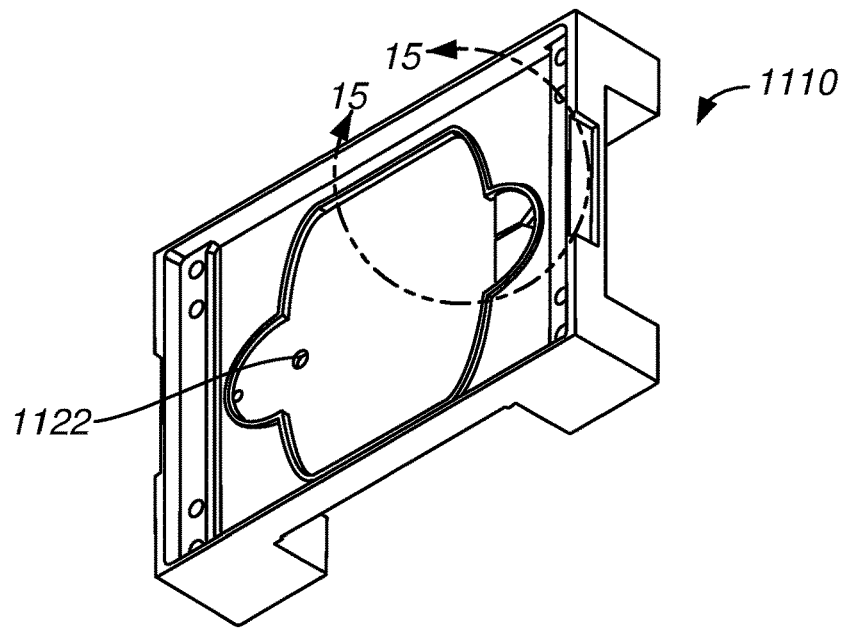
FIGS. 14 and 15 show examples schematic illustrations of a base of an EcoFAB device.
Figure 15:
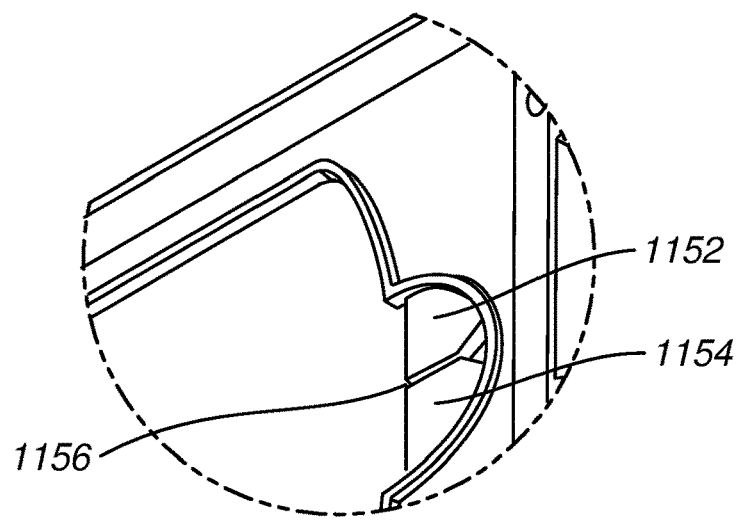

FIG. 13 shows an example of a schematic illustrations of a bottom-view of a base of an EcoFAB device. FIGS. 14 and 15 show examples of schematic illustrations of a base of an EcoFAB device. FIG. 15 is an enlarged view of a portion of FIG. 14.

As shown in FIG. 13-15, a base 1110 of a device includes a first port 1116, a second port 1118, and a stem port 1122. The base 1110 is similar to the base 110 shown in FIGS. 1-12 with the addition of a first feature 1152 and a second feature 1154 proximate the second port 1118. The first feature 1152 and the second feature 1154 are operable to prevent roots of the plant from growing into the second port 1118. In some embodiments, the first feature 1152 and the second feature 1154 both comprise a raised platform on a surface of the base 1110. The first feature 1152, the second feature 1154, and a substrate disposed on a first surface of the base 1110 define a channel 1156 operable to permit fluid to flow from the root chamber to the second port 1118.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
    a base;
    a substrate in contact with a first surface of the base, the substrate and the base defining a root chamber; and
    an enclosure in contact with a second surface of the base, the base and the enclosure defining a growth chamber, the base defining a stem port connecting the root chamber and the growth chamber, the base further defining a first port in fluid communication with the root chamber and a second port in fluid communication with the root chamber, the device being operable to contain a plant, roots of the plant being in the root chamber, a stem of the plant passing through the stem port, and leaves of the plant being in the growth chamber, the base further defining a raised platform on a surface of the base proximate the second port, the raised platform and the substrate defining a channel being operable to permit fluid to flow from the root chamber to the second port, the raised platform being operable to prevent roots of the plant from growing into the second port.

2. The device of claim 1, further comprising:
    a backing plate, wherein the backing plate is affixed to the base, and wherein the backing plate is operable to hold the substrate in contact with the first surface of the base.

3. The device of claim 1, further comprising:
    a gasket, wherein the gasket is disposed between the substrate and the base.

4. The device of claim 1, wherein the substrate comprises a sheet of glass.

5. The device of claim 1, wherein a diameter of the stem port is about 1 millimeter to 5 millimeters.

6. The device of claim 1, wherein the base and the enclosure each comprise a polymer.

7. The device of claim 1, wherein the base and the enclosure each comprise a material selected from a group consisting of polycarbonate, polypropylene, polyethylene, and a cyclic olefin copolymer.

8. The device of claim 1, wherein the first surface of the base has a smaller thickness proximate the first port compared to the second port such that substrate has a downward slope from level from the first port to the second port when the device is sitting on a level surface.

9. The device of claim 8, wherein, the substrate has a downward slope of about 0.5 to 30 degrees from level from the first port to the second port.

10. The device of claim 1, wherein a volume of the root chamber is about 4 milliliters to 20 milliliters.

11. The device of claim 1, where a volume of the growth chamber is about 250 milliliters to 1000 milliliters.

12. The device of claim 1, wherein the enclosure is transparent to visible light and to infrared light.

13. The device of claim 1, wherein the base is transparent to infrared light, and wherein the base blocks at least a portion of light in the visible spectrum.

14. The device of claim 1, wherein ridges are defined on the enclosure, and wherein the ridges are operable to aid a robotic arm in manipulating the device.

15. The device of claim 1, wherein indentations are defined in the base, and wherein the indentations are operable to aid a robotic arm in manipulating the device.

16. The device of claim 1, wherein the first port is outside of the growth chamber, and wherein the second port is outside the growth chamber.

* * * * *